US008903544B2

(12) United States Patent
Uezono et al.

(10) Patent No.: US 8,903,544 B2

(45) Date of Patent: Dec. 2, 2014

(54) SHEET HANDLING APPARATUS AND SHEET HANDLING METHOD

(71) Applicants: Satoko Uezono, Kanagawa-Ken (JP); Takahito Shinfuku, Tokyo (JP)

(72) Inventors: Satoko Uezono, Kanagawa-Ken (JP); Takahito Shinfuku, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 70 days.

(21) Appl. No.: 13/727,953

(22) Filed: Dec. 27, 2012

(65) Prior Publication Data

US 2013/0261789 A1 Oct. 3, 2013

(30) Foreign Application Priority Data

Mar. 30, 2012 (JP) ................................. 2012-082717

(51) Int. Cl.

| | |
|---|---|
| ***G06F 7/00*** | (2006.01) |
| ***B07C 5/34*** | (2006.01) |
| ***G07D 11/00*** | (2006.01) |

(52) U.S. Cl.

CPC .............. *B07C 5/34* (2013.01); *G07D 11/0084* (2013.01)

USPC ........... 700/226; 700/213; 700/223; 700/224; 700/225; 700/228; 700/231

(58) Field of Classification Search

None

See application file for complete search history.

(56) References Cited

U.S. PATENT DOCUMENTS

| | | | | |
|---|---|---|---|---|
| 6,659,260 B2 | 12/2003 | Otsuka et al. | | |
| 2006/0157390 A1 | 7/2006 | Otsuka | | |
| 2007/0122023 A1 * | 5/2007 | Jenrick et al. | ................. | 382/135 |
| 2009/0026116 A1 | 1/2009 | Lubbers | | |
| 2011/0054670 A1 * | 3/2011 | Kochiwa et al. | .............. | 700/218 |
| 2012/0235351 A1 * | 9/2012 | Sakoguchi et al. | ...... | 271/265.01 |

FOREIGN PATENT DOCUMENTS

| | | | |
|---|---|---|---|
| EP | 2234074 | A1 | 9/2010 |
| EP | 2267666 | | 12/2010 |
| JP | 06-290328 | A | 10/1994 |
| JP | 2002-197516 | A | 7/2002 |
| JP | 2004-318518 | A | 11/2004 |
| JP | 2006-202036 | A | 8/2006 |
| WO | 2011121733 | | 10/2011 |

OTHER PUBLICATIONS

European Search report Dated Apr. 10, 2013.

Notice of Allowance issued in related Korean Patent Application No. 10-2013-4092, mailed Apr. 9, 2014, 3 pages (with translation).

Translation of Office Action issued in related Russian Patent Application No. 2013101606, 3 pages.

* cited by examiner

*Primary Examiner* — Yolanda Cumbess

(74) *Attorney, Agent, or Firm* — Baker Botts L.L.P.

(57) ABSTRACT

A sheet handling apparatus includes pickup unit which picks up a plurality of sheets loaded in a loading unit, a first determining unit which determines a type or a state of the sheet picked up by the pickup unit, a data collecting unit which collects handling amount data for respective types of the sheets or respective states of the sheets, a second determining unit which determines a distribution destination of the sheet based on the handling amount data for the respective types or the respective states of the sheets which are determined by the first determining unit, a distributing unit which distributes the sheet based on a determination result of the distribution destination of the sheet by the second determining unit, and a stacking unit composed of a plurality of cassettes to stack the distributed sheets.

16 Claims, 8 Drawing Sheets

SHEET HANDLING APPARATUS AND SHEET HANDLING METHOD

CROSS-REFERENCE TO RELATED APPLICATION

This application is based upon and claims the benefit of priority from Japanese Patent Application No. 2012-082717, filed on Mar. 30, 2012, the entire contents of which are incorporated herein by reference.

FIELD

Exemplary embodiments described herein relate to a sheet handling apparatus and a sheet handling method.

BACKGROUND

Sheet handling apparatus are known, in which a plurality of sheets of a plurality of types are loaded together, and which sorts the sheets according to banknote types and states such as soilure degrees or orientations, and stacks the sorted sheets in a plurality of cassettes.

For example, a banknote handling apparatus as a sheet handling apparatus is an apparatus which sorts a plurality of banknotes of a plurality of banknote types according to conditions such as a banknote type or the state of the banknotes. Such a banknote handling apparatus has a plurality of cassettes assigned in accordance with the conditions of the banknotes (type or the state of the banknotes). In the above-described banknote handling apparatus, a discrimination unit discriminates the type of banknotes or the state of banknotes, and the respective banknotes are stacked in the respective cassettes on the basis of the discrimination results.

If, for example, it is expected that a plurality of banknotes to be handled will include many banknotes of a specific banknote type, the banknote type of banknotes expected to be included in large quantity is assigned to a cassette (storing portion) with which an operator can easily work. This makes it possible for the operator to easily work with the cassette which is filled to capacity with the highest frequency.

In the conventional banknote handling apparatus, however, the assignment of the conditions (banknote type or state) of banknotes to a plurality of cassettes is fixed or can be changed only by special operation.

DETAILED DESCRIPTION

In general, according to one embodiment, there is provided a sheet handling apparatus including: a pickup unit which picks up a plurality of sheets loaded in a loading unit; a first determining unit which determines a type or a state of the sheet picked up by the pickup unit; a data collecting unit which collects handling amount data for respective types of the sheets or respective states of the sheets); a second determining unit which determines a distribution destination of the sheet based on the handling amount data for the respective types or the respective states of the sheets which are determined by the first determining unit; a distributing unit which distributes the sheet based on a determination result of the distribution destination of the sheet by the second determining unit; and a stacking unit composed of a plurality of cassettes to stack the distributed sheets, wherein the data collecting unit receives the handling amount data of the respective types or the respective states obtained by external sheet handling from an external apparatus.

Hereinafter, embodiments will be described with reference to the drawings.

Figure 1A:
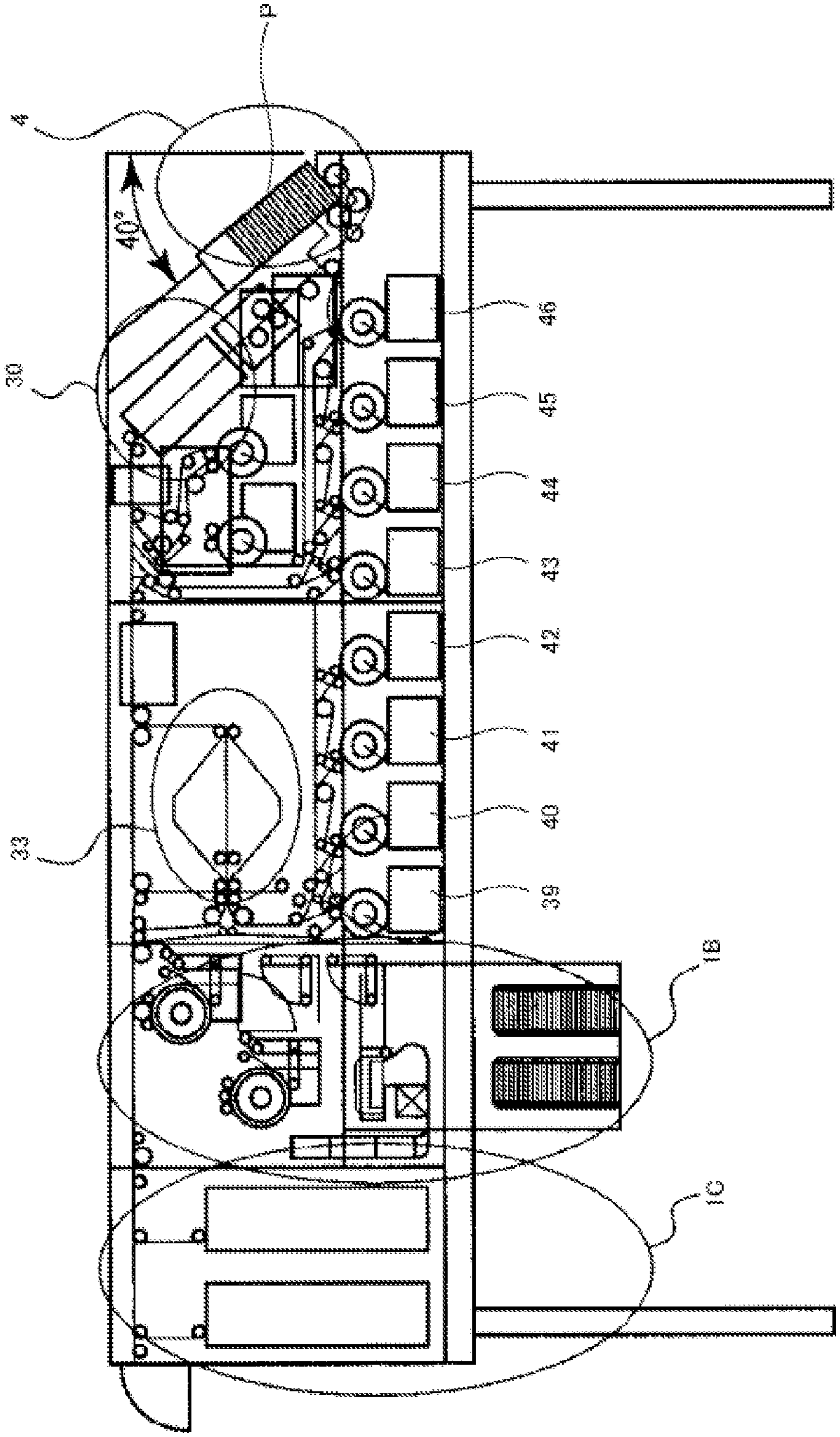
FIG. 1A is a schematic diagram showing a first example of a banknote handling system (a sheet handling apparatus) according to an embodiment.
Figure 1B:
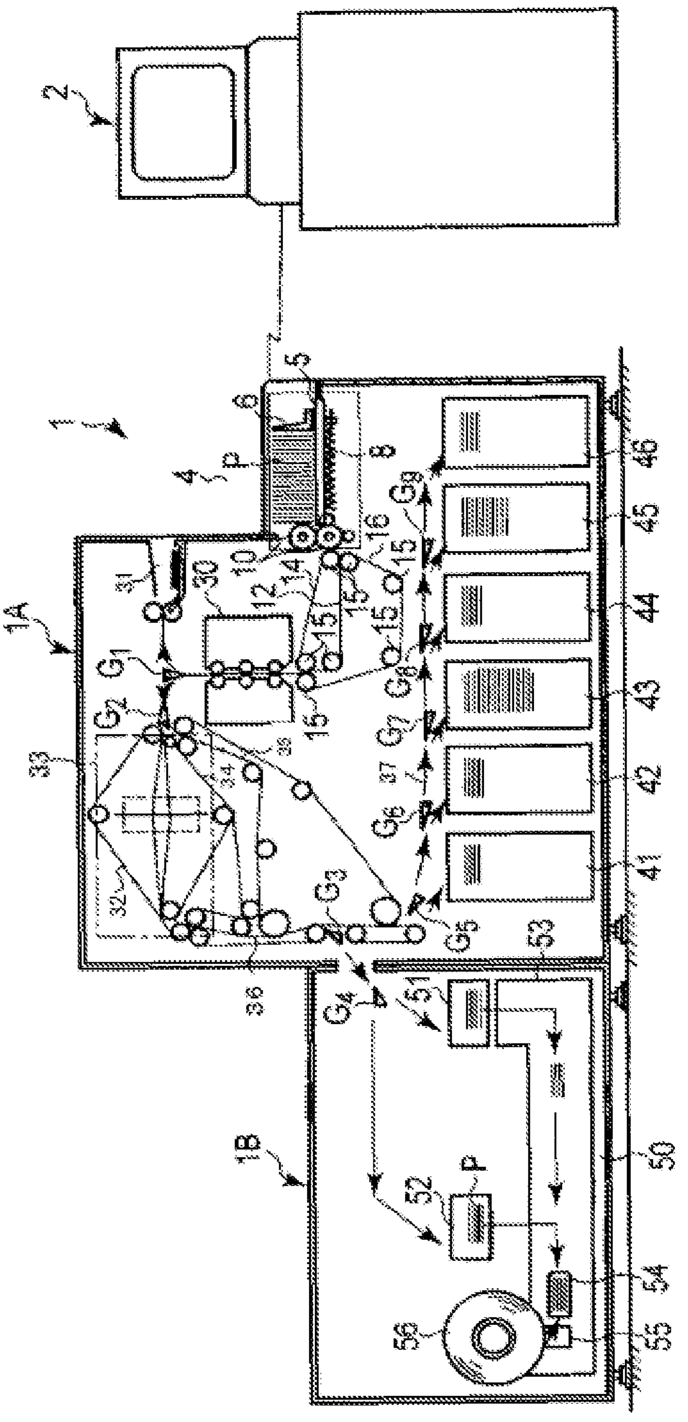
FIG. 1B is a schematic diagram showing a second example of a banknote handling system (a sheet handling apparatus) according to an embodiment.

FIG. 1A shows a first example of a banknote handling system (sheet handling apparatus) according to an embodiment. FIG. 1B shows a second example of a banknote handling system (sheet handling apparatus) according to the embodiment.

For example, a banknote handling system shown in FIG. 1A and FIG. 1B can handle sheets (banknotes, for example) of a plurality of countries, and an operator sets a country of sheets to be handled to the banknote handling system.

For example, as shown in FIG. 1A, a loading unit 4 picks up a plurality of stacked banknotes. A detection unit 30 determines a banknote type of the banknote. The banknote whose type has been determined passes through a conveying path, and a reversing mechanism 33 reverses the banknote based on the banknote type determination data. After that, the banknote is stacked in cassettes 39-46. The banknote handling system includes a sealing device 1B adjacent to it, and further includes a large capacity stacking device 1C adjacent to the sealing device 1B.

As will be described later, the banknote handling system automatically assigns the cassettes 39-46 for the respective banknote types based on the banknote handling amount data for the respective types stored in a memory, and distributes the banknotes to the cassettes 39-46 in accordance with the respective banknote types.

For example, the banknote handling system receives the banknote handling amount data for the respective types collected by another sheet handling system through a network and so on, or reads out the banknote handling amount data for the respective types collected by a sheet handling system from various types of storage media, and automatically assigns the cassettes 39-46 for the respective banknote types based on the banknote handling amount data for the respective types which have been received or read out.

In addition, the banknote handling system can assign the cassettes 39-46 for the respective banknote types based on the assignment indication of the cassettes 39-46 in accordance with banknote types from an operator. In case that the assignment of the cassettes 39-46 has not been made, the banknote handling system assigns collection of a banknote of the smallest face value to a first cassette 46 (the nearest cassette from a seat of an operator), and assigns collection of a banknote of the second smallest face value to a second cassette 46 (the second nearest cassette from the seat of the operator).

In the case of switching and handling banknotes of a plurality of countries, the banknote handling system can store setting of assignment of the cassettes for the respective banknote types of the plurality of countries.

Next, the banknote handling system will be described in detail with reference to FIG. 1B. The fundamental operations of the banknote handling system shown in FIG. 1A and the banknote handling system shown in FIG. 1B are same.

The banknote handling system is composed of a banknote handling apparatus body 1 and a controller 2 for operating the banknote handling apparatus body 1. The banknote handling apparatus body 1 controlled by the controller 2 may be a single apparatus or may include a plurality of apparatuses.

The banknote handling apparatus body 1 has a sorting and stacking device 1A which sorts banknotes (sheets) according to the type or state, and collects the sorted banknotes for each type or state, and a sealing device 1B which seals banknotes for every predetermined numbers of banknotes. The banknote handling apparatus body 1 is configured to allow an arbitrary number of sealing devices 1B to be connected to the single sorting and stacking device 1A.

A plurality of banknotes of a plurality of types are loaded altogether into the sorting and stacking device 1A. The sorting and stacking device 1A sorts the loaded banknotes according to the type and state of the respective loaded banknotes. The sorting and stacking device 1A conveys the sorted banknotes to the respective cassettes (cassettes) or the sealing device 1B. The sealing device 1B stacks the banknotes supplied from the sorting and stacking device 1A into a cassette (cassette), and seals the banknotes for every predetermined number of banknotes.

The controller 2 performs control on the banknote handling apparatus body 1, operation setup for the banknote handling apparatus body 1, management of data to be handled by the banknote handling apparatus body 1, and so on. The controller 2 is composed of a personal computer, for example. The controller 2 has a display unit, an operation unit, a memory, and so on which will be described later.

Next, the internal arrangement of the banknote handling apparatus body 1 will be described.

As shown in FIG. 1B, the banknote handling apparatus body 1 is composed of the sorting and stacking device 1A and the sealing device 1B.

The sorting and stacking device 1A is provided with a loading unit 4 (un-handled banknote storing portion) into which a plurality of banknotes P are loaded. A plurality of banknotes including a plurality of types are loaded altogether into the loading unit 4. Each banknote P to be loaded into the loading unit 4 has a longitudinal direction and a width direction. Each banknote is loaded into the loading unit 4 with its upper end or lower end in the longitudinal direction thereof facing downwards.

In addition, the banknote handling apparatus body 1 of the banknote handling system shown in FIG. 1B holds the banknote in the tilted state against the vertical direction by about 40 degrees.

The loading unit 4 has a stage 5, a backup plate 6, and pickup rollers 10. A plurality of banknotes P are loaded onto the stage 5 in the state in which their upper ends or lower ends are brought into contact with the stage 5 and they are aligned. The backup plate 6 vertically stands on the stage 5. The backup plate 6 is configured to move to the pickup rollers 10 side (left direction in the drawing) along the stage 5 by a spring 8. The pickup rollers 10 are composed of a pair of rollers. The pickup rollers 10 rotate in the predetermined direction to thereby sequentially pick up the banknote P located on the left end on the stage 5 in the drawing. Therefore, the plurality of banknotes P loaded into the loading unit 4 are moved to the left in the drawing along the stage 5 by the backup plate 6, and are pressed against the pickup rollers 10 (pickup portion).

A conveying path 12 is provided in the subsequent stage of the pickup rollers 10. The conveying path 12 is composed of a plurality of rollers 15 and conveyor belts 14, 16. The banknote P is conveyed in the conveying path 12 by the conveyor belts 14, 16 driven by the plurality of rollers 15. The banknotes P picked up by the pickup rollers 10 are sequentially supplied into the conveying path 12. For example, the pickup rollers 10 supply the banknote P to the conveying path 12 in the width direction with the upper end or lower end thereof taking the lead. In addition, the banknotes P supplied onto the conveying path 12 by the pickup rollers 10 have their front and back surfaces randomly. In the arrangement example shown in FIG. 1A, the pickup direction of the banknote P picked up from the loading unit 4 faces down.

A detection unit 30 is provided in the conveying path 12 extending in the subsequent stage of the pickup rollers 10. The detection unit 30 detects (discriminates) characteristics of the banknote P, such as the banknote type, the front and back surfaces, the front and rear ends, the presence and absence of soil or damage. The detection unit 30 is composed of various types of sensors. The various types of sensors provided for the detection unit 30 read various kinds of information from the banknote P conveyed in the conveying path 12. The detection unit 30 is provided with, for example, an image sensor which reads an image on the observer surface of the banknote P, a sensor which detects the thickness of the banknote P, and a sensor which detects a magnetic body contained in the banknote P. A determination unit (to be described later) determines the characteristics of the banknote P as described above on the basis of the information read by the respective sensors of the detection unit 30.

In the sorting and stacking device 1A shown in FIG. 1B, a plurality of banknotes P with their front and back surfaces and the front and rear ends been randomly directed are loaded into the loading unit 4. Consequently, the respective banknotes P which pass through the detection unit 30 are in the state that the front and back surfaces and the front and rear ends are randomly directed. Here, there are four types of directions with respect to the front and back surfaces and the front and rear ends of the banknote P passing through the detection unit 30. In the following description, the banknote P which is picked up with the observe surface facing up and the upper end facing forward in the conveying direction will be referred to as a front/front (FF) banknote, the banknote P which is picked up with the observe surface facing up and the lower end facing forward in the conveying direction will be referred to as a front/rear (FR) banknote, the banknote P which is picked up with the reverse surface facing up and the upper end facing forward in the conveying direction will be referred to as a back/front (BF) banknote, and the banknote P which is picked up with the reverse surface facing up and the lower end facing forward in the conveying direction will be referred to as a back/rear (BR) banknote. That is, the banknote P passing through the detection unit 30 is conveyed in one of these four types of postures in conveyance.

A plurality of gates G1 to G9 for selectively switching the conveying direction of the banknote P on the basis of the detection results in the detection unit 30 are provided on the conveying path 12 extending in the subsequent stage of the detection unit 30.

First of all, the gate G1 sorts the banknotes P into those which can be handled in the subsequent stage and those which are to be rejected. For example, a banknote for which the detection unit 30 determines that handling in the subsequent stage cannot be performed is conveyed to a reject box 31 (right direction in the drawing) through the gate G1. Banknotes for which handling in the subsequent stage cannot be performed include, for example, two banknotes which are determined as banknotes picked up simultaneously, a banknote determined as the one which is skewed beyond a predetermined level, and banknotes which are not determined as fit banknotes which can be recirculated, such as unfit banknotes and counterfeit banknotes (not limited to banknotes). The reject box 31 is accessible from the outside of the sheet handling apparatus 1. That is, an operator can take out the banknotes P stacked in the reject box 31.

On the other hand, the banknote P determined by the detection unit 30 as the one for which handling in the subsequent stage can be performed is conveyed to the gate G2 (left direction in the drawing) through the gate G1. The gate G2 distributes the banknote P in accordance with the observe and reverse surface state. The conveying path on the downstream side of the gate G2 branches in two directions. That is, the gate G2 selectively switches the conveying direction of the banknote P to the two directions in accordance with the observe and reverse surface state.

A reversing mechanism 33 (front and back surfaces reversing unit) which reverses the front and back surfaces of the banknote P is provided on one conveying path which branches off on the downstream side of the gate G2. In addition, another conveying path 35 which branches off on the downstream side of the gate G2 is a conveying path through which the banknote P is simply made to pass without changing the orientations of the front and back surfaces of the banknote P. That is, the front and back surfaces of the banknotes P can be made to face the same direction in the subsequent stage of the gate G2.

The reversing mechanism 33 is composed of two conveyor bests 32, 34. The conveyor belts 32 and 34 are rotated around the central axis by 180° from the inlet to the outlet to form a twisted conveying path. Therefore, the front and back surfaces of the banknote P distributed to the reversing mechanism 33 by the gate G2 are reversed. For example, the front and back surfaces of an FF banknote are reversed by the reversing mechanism 33, and thereby the FF banknote is reversed into a BF banknote with its reverse surface facing up.

Both the banknote P whose front and back surfaces have been reversed upon passing through the reversing mechanism 33, and the banknote P which has passed through the conveying path 35 without passing through the reversing mechanism 33 are fed to the gate G3 through a merging portion 36.

The handling time (conveying time) required for the banknote P to arrive from the gate G2 to the merging portion 36 through the reversing mechanism 33 is set to be equal to the conveying time required for the banknote P to arrive from the gate G2 to the merging portion 36 through the conveying path 35. This makes it possible for the banknote P conveyed through the reversing mechanism 33 and the banknote P conveyed through the conveying path 35 to pass through the merging portion 36 at the same timing.

The gate G3 distributes the banknote P passing through the merging portion 36. The conveying path on the downstream side of the gate G3 branches in two directions. The gate G3 selectively switches the conveying direction of the banknote P to the two directions in accordance with the type (or state) of the banknote P.

One conveying path which branches off on the downstream side of the gate G3 is a conveying path for conveying the banknote P to the sealing device 1B. In addition, another conveying path (horizontal conveying path) 37 which branches off on the downstream side of the gate G3 is a conveying path for collecting the banknotes P in the respective cassettes 41-46 in the sorting and stacking device 1A. In addition, each of the cassettes 41-46 is provided with a sensor which detects the presence or absence of a banknote.

That is, the horizontal conveying path 37 which branches off in the right direction in the drawing by the gate G3 forms a conveying path extending in an almost horizontal direction above the plurality of cassettes 41-46. The five gates G5-G9, each for distributing and collecting the banknote P in a corresponding one of the six cassettes 41-46, are provided on the horizontal conveying path 37.

The banknote P selectively distributed by the gate G5 on the most upstream side of the horizontal conveying path 37 is stacked in the cassette 41. The banknote P selectively distributed by the gate G6 is stacked in the cassette 42. The banknote P selectively distributed by the gate G7 is stacked in the cassette 43. The banknote P selectively distributed by the gate G8 is stacked in the cassette 44. The banknote P selectively distributed by the gate G9 is stacked in the cassette 45 or the cassette 46.

As shown in FIG. 1B, the sealing device 1B has a cassette 51, a cassette 52, a supply unit 53, a sealing mechanism 54, a printing mechanism 55, and a strap supply unit 56. The cassettes 51 and 52 stack the banknotes P respectively fed through the gate G4. Each of the cassettes 51 and 52 is provided with a sensor which detects the presence or absence of a banknote.

The supply unit 53 supplies a predetermined number (100 sheets, for example) of banknotes P stacked in the cassette 51 or 52 to the sealing mechanism 54. The sealing mechanism 54 is a sealing mechanism to seal the predetermined number (100 sheets, for example) of banknotes P which are supplied by the supply unit 53 and stacked in the cassette 51 or 52 with a paper strap. The printing mechanism 55 prints desired print data on a paper strap used by the sealing mechanism 54. The strap supply unit 56 supplies a paper strap to be used by the sealing mechanism 54.

The banknotes P are supplied to the sealing device 1B by the conveying path which branches off in the left direction in the drawing by the gate G3 of the sorting and stacking device 1A. The conveying directions of the banknotes P supplied from the sorting and stacking device 1A are selectively switched to the two directions by the gate G4 in the sealing device 1B. The banknotes P which are branched and conveyed by the gate G4 are selectively stacked in the cassette 51 or the cassette 52 in the sealing device 1B.

The banknotes P stacked in the cassette 51 or 52 through the gate G4 are fed to the sealing mechanism 54 by the supply unit 53. The sealing mechanism 54 seals the predetermined number of banknotes P supplied by the supply unit 53 with the paper strap supplied from the strap supply unit 56. A Bundle of banknotes P obtained by sealing the banknotes P for every predetermined number of banknotes is unloaded outside the apparatus through a conveyer (not shown).

In addition, the sorting and stacking device 1A is configured to supply banknotes of a specific banknote type to the sealing device 1B, on the basis of the settings to be described later. Therefore, the sealing device 1B is configured to seal banknotes of the specific banknote type supplied from the sorting and stacking device 1A. In addition, banknotes P of banknote types other than the banknote type of the banknotes to be sealed by the sealing device 1B are stacked in one of the cassettes 41-46 in the sorting and stacking device 1A.

Next, the control system of the sheet handling system will be described.

Figure 2:
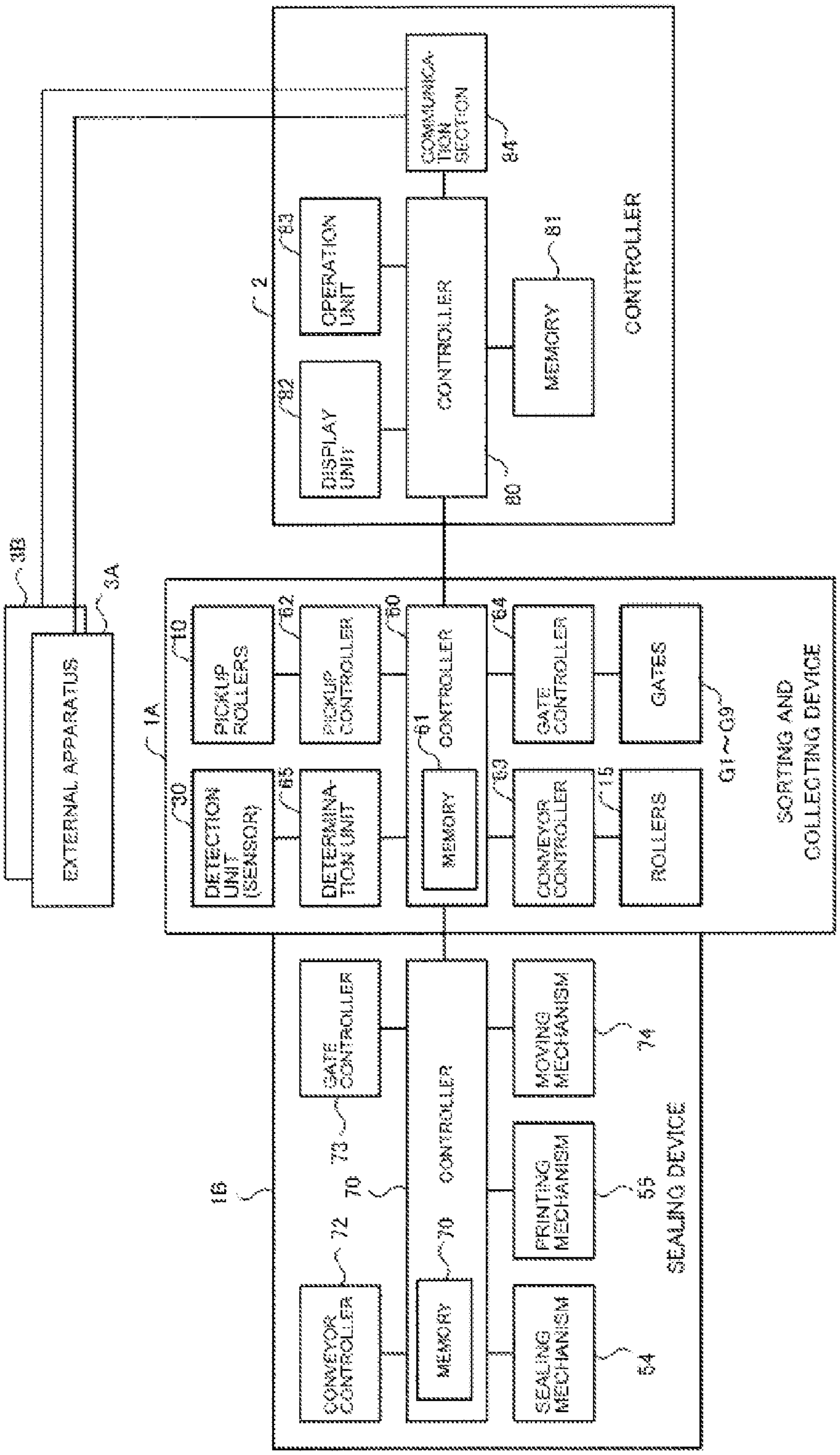
FIG. 2 is a block diagram showing an example of the configuration of the control system of the banknote handling system.

FIG. 2 is a view showing a block diagram of the control system of the banknote handling system.

As shown in FIG. 2, the control system of the sorting and stacking device 1A of the banknote handling apparatus body 1 is composed of a controller 60, a memory 61, a pickup controller 62, a conveyor controller 63, a gate controller 64 and a determination unit 65, and so on.

The controller 60 controls the overall operation of the sorting and stacking device 1A in accordance with an operation program set in advance. The operation program to be executed by the controller 60 is stored in the memory 61. The memory 61 is also used for storing data. For example, the memory 61 is provided with count tables for counting the numbers of banknotes respectively stacked in the cassettes 41-46, and cassettes 51 and 52 of the sealing device 1B.

The pickup controller 62 drives the pickup rollers 10 under the control of the controller 60. The conveyor controller 63 drives the rollers 15, and so on, under the control of the controller 60. The gate controller 64 drives the gates G1-G3 and G5-G9 under the control of the controller 60.

The determination unit 65 determines the state of the banknote P on the basis of detection result of the detection unit 30. The determination unit 65 determines the characteristics of the banknote P by comparing the information read by the each sensor with reference information. In addition, the determination unit 65 outputs the determination result based on the detection results of the detection unit 30 to the controller 60.

For example, the determination unit 65 determines the banknote type of the banknote P, and also determines the observe and reverse surface state and the front and rear end state of the banknote P. Furthermore, the determination unit 65 determines whether the banknote P is a fit or an unfit banknote. A fit banknote is a banknote that can be re-circulated, and an unfit banknote is a banknote that can not be re-circulated. That is, whether a given banknote is a fit banknote or an unfit banknote is determined on the basis of the state (quality) of the banknote. The determination unit 65 determines whether a given banknote is a fit banknote or an unfit banknote, on the basis of, for example, how the banknote is soiled, ripped, or creased, the paper quality of the banknote, and how much the ripped banknote has been repaired with tape or the like.

As shown in FIG. 2, the control system of the sealing device 1B of the banknote handling apparatus body 1 is composed of a controller 70, a memory 71, a conveyor controller 72, a gate controller 73, a moving mechanism 74, the sealing mechanism 54, the printing mechanism 55, and the like.

The controller 70 controls the overall operation of the sealing device 1B in accordance with an operation program set in advance. The operation program to be executed by the controller 70 is stored in the memory 71. The conveyor controller 72 drives the conveyor rollers under the control of the controller 70. The gate controller 73 drives the gate G4 under the control of the controller 60. The moving mechanism 74 moves (conveys) a predetermined number of sheets stacked in the cassette 51 or 52 under the control of the controller 70.

As shown in FIG. 2, the control system of the controller 2 is composed of a controller 80, a memory 81, a display unit 82, an operation unit 83, a communication section 84, and the like.

The controller 80 handles the overall control of the controller 2 in accordance with an operation program set in advance. For example, the controller 80 has a function of performing various types of operation setups and so on for the sorting and stacking device 1A on the basis of an operation instruction from an operator. The operation program to be executed by the controller 80 is stored in the memory 81. In addition, setting information and the like for the cassettes 41-46 of the sorting and stacking device 1A and the cassettes 51, 52 of the sealing device 1B are stored in the memory 81 in correspondence with a preset (setup name) to be described later.

The display unit 82 displays operation guidance and the like for an operator on the basis of the display control by the controller 80. The operator inputs operation instructions to the operation unit 83. The display unit 82 is composed of a display device or the like. The operation unit 83 is composed of an input device such as a keyboard or a mouse or the like. The display unit 82 and the operation unit 83 may be composed of a display device incorporating a touch panel. Furthermore, the display unit 82 and the operation unit 83 may be composed of a display device incorporating a touch panel and an input device such as a keyboard.

The communication section 84 is connected to an external apparatus 3 (another sheet handling system, for example), communicates with the external apparatus 3, and receives the banknote handling amount data for the respective types (for each type of banknote) to be described later or the banknote circulation amount data for the respective types (for each type of banknote) and so on.

Next, settings for the respective cassettes (cassettes) 41-46, 51, 52 of the banknote handling apparatus body 1 by the controller 2 will be described.

Here it is assumed that the display unit 82 and the operation unit 83 are composed of a display device incorporating a touch panel. In addition, it is assumed that setting for the respective cassettes 41-46, 51, 52 are performed by a manager (supervisor).

Figure 3:
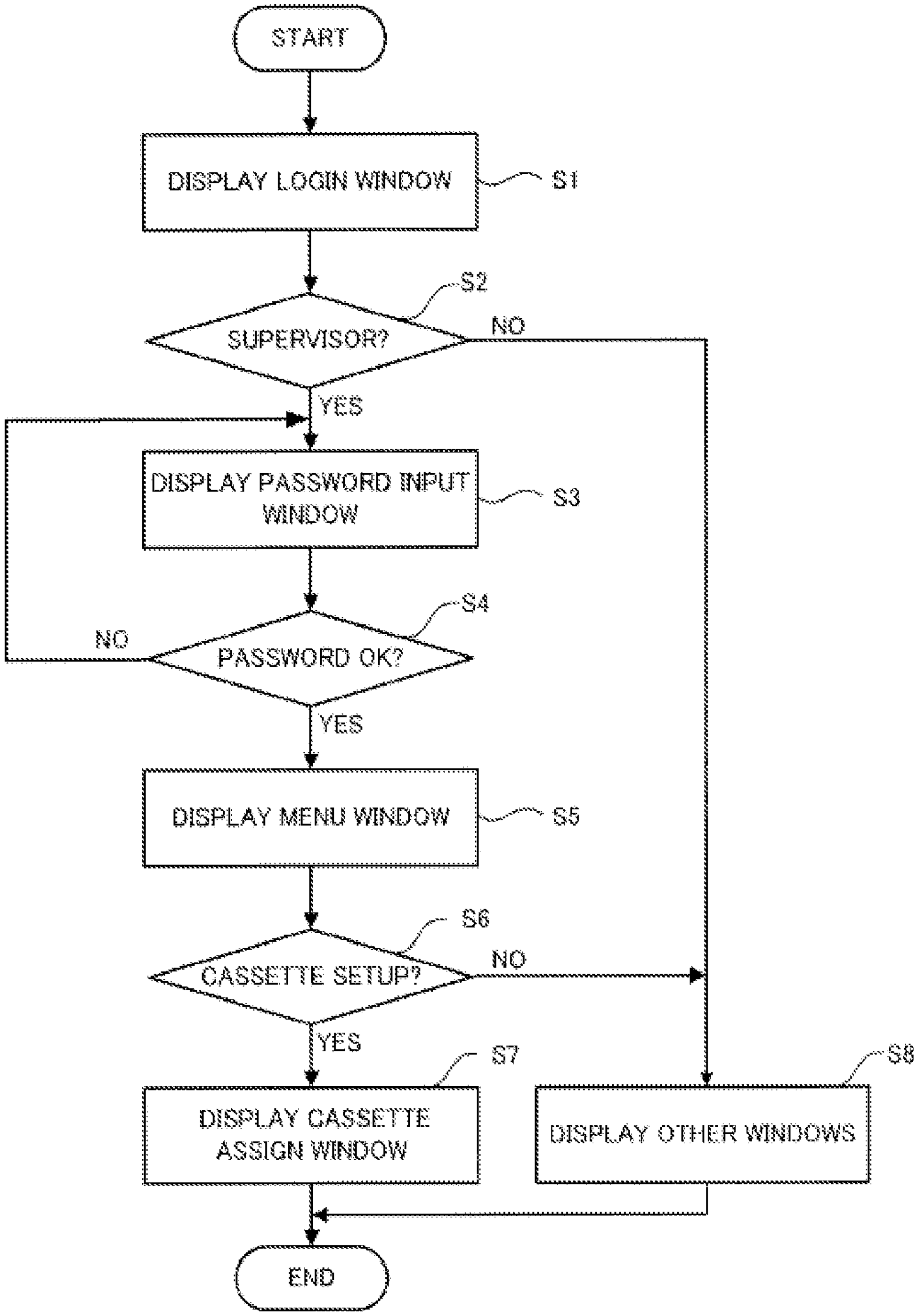
FIG. 3 is a flow chart for describing an example of the operation of displaying a cassette setup window in the controller.
Figure 4:
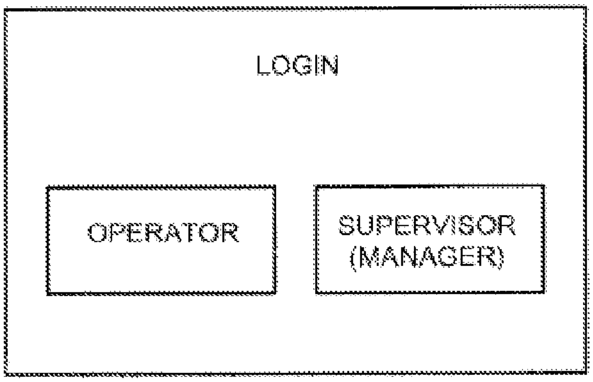
FIG. 4 is a view showing a display example of a login window.
Figure 5:
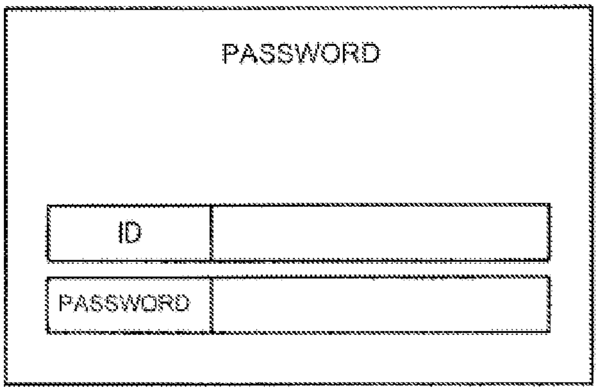
FIG. 5 is a view showing a display example of a supervisor authentication window.
Figure 6:
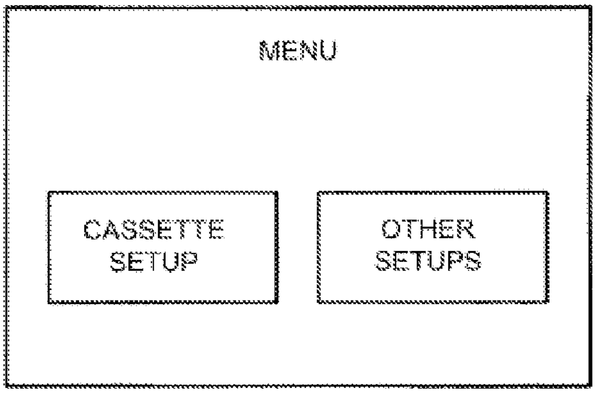
FIG. 6 is a view showing a display example of a menu window for the supervisor.

FIG. 3 is a flowchart for describing the operation to display a cassette setup window by the controller 2. In addition, FIG. 4 shows a display example of a login window. FIG. 5 shows a display example of a supervisor authentication window. FIG. 6 shows a display example of a menu window for a supervisor.

The controller 80 displays a login window on the display unit 82 (step S1). For example, as shown in FIG. 4, the above-described login window displays selection buttons for a supervisor (a manager who has the authority to change settings and so on) and an operator (who has no management authority). When the button for selecting the supervisor is input on such a login window (YES, in step S2), the controller 80 displays an authentication window for the relevant supervisor on the display unit 82 (step S3). For example, as shown in FIG. 5, the supervisor authentication window displays an input window for the ID information and the password of the relevant supervisor.

When the authentication information (ID information and password) is input in the window like this, the controller 80 determines whether or not the input authentication information is correct (step S4). If the controller 80 determines that the input authentication information is correct by this determination (YES, in step S4), the controller 80 displays a menu window for the supervisor on the display unit 82 (step S5).

For example, as shown in FIG. 6, at least a button for selecting cassette setup (cassette assign) is displayed on the menu window for the supervisor. When the button for selecting cassette setup is input on the menu window for the supervisor like this (YES, in step S6), the controller 80 displays a cassette assign window to be described later on the display unit 82 (step S7). In this cassette assign window, setup for each cassette in the banknote handling apparatus body 1 is performed (setup of conditions for banknotes to be assigned to each cassette).

As described above, only a supervisor who is authenticated by the authentication information such as a password can perform setup for each cassette or setup of a fitness level for sorting a fit banknote and an unfit banknote. That is, in the above-described banknote handling system, banknotes are sorted on the basis of the setting contents set by the supervisor. This can prevent a general operator (who has no management authority) from changing the settings for each cassette or the fitness level setting.

Next, a setup window for the cassettes 41-46, 51, 52 will be described.

Figure 7:
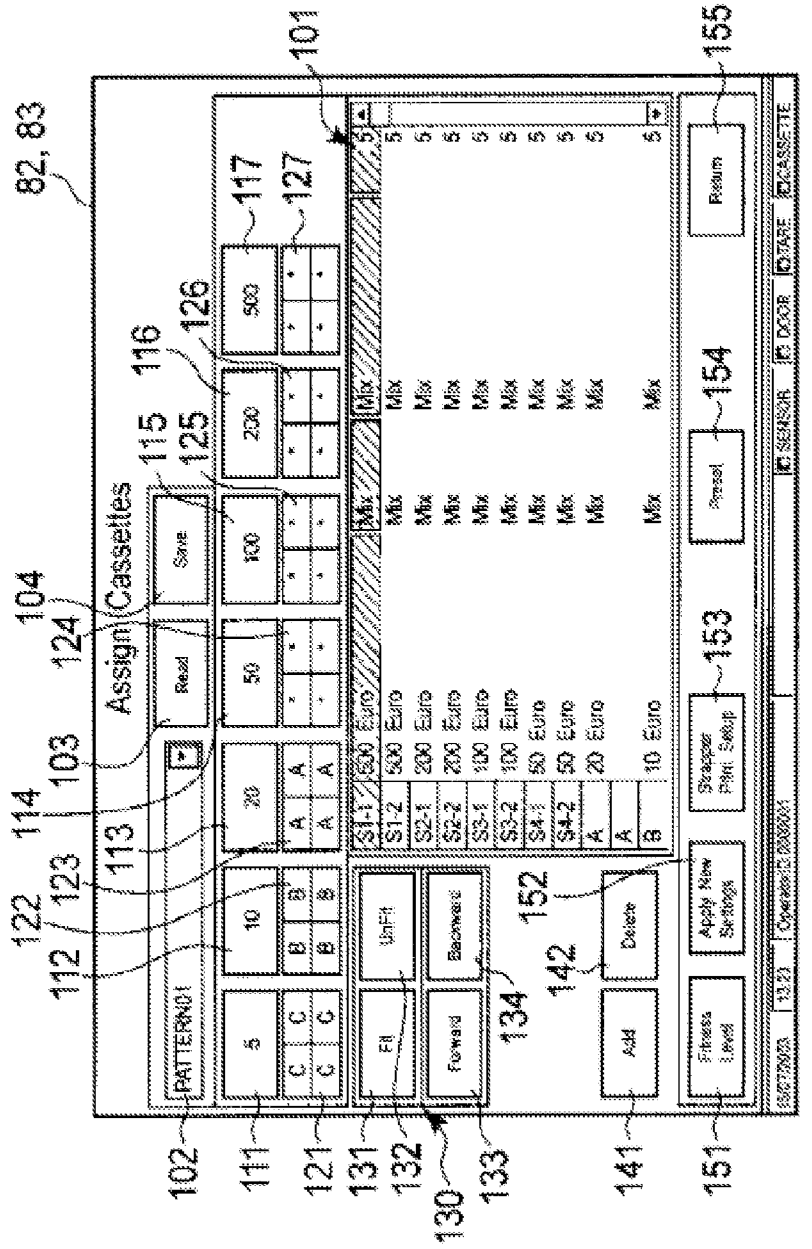
FIG. 7 is a view showing a display example of a setup window (cassette assign window) for the respective cassettes.

FIG. 7 is a display example of a setup window (cassette assign window) for each cassette.

In the display example shown in FIG. 7, the cassette assign window is composed of a display window 101 of setup state, a display window 102 of setup name, a read button 103, a memory button 104, banknote type designation buttons 111-117, state display icons 121-127, a state designation button 130 (131-134), an add button 141, a delete button 142, a fitness level setup button 151, an apply button 152, a strap print setup button 153, a preset button 154, a return button 155, and the like.

The display window 101 is a display area which displays the setting information of each cassette. The display window 101 displays a list of banknote types, conditions of the banknotes, and the like which are assigned to the respective cassettes 41-46, 51, 52. In the display example shown in FIG. 7, information indicating each cassette is displayed in a left end field on the display window 101. For example, "S1-1" indicates the cassette 51 of the sealing device 1B, and "S1-2" indicates the cassette 52 of the sealing device 1B. In addition, "S2-1"-"S4-2" indicate the respective cassettes of the second and subsequent sealing devices.

In addition, FIG. 1B shows the arrangement in which one sealing device is connected to the sorting and stacking device 1A, but as described above, the sheet handling system allows a plurality of sealing devices to be connected to the single sorting and stacking device 1A. In case that a plurality of sealing devices are connected to the single sorting and stacking device 1A, "S2-1" to "S4-2" indicate the respective cassettes of the second and subsequent sealing devices.

In the example of the display window 101 shown in FIG. 7, "A" in the left end field indicates the cassette 41 in the sorting and stacking device 1A shown in FIG. 1B, and "B" indicates the cassette 42 in the sorting and stacking device 1A. Here, in the display example shown in FIG. 7, two "A" fields are provided. This indicates that two types of banknotes can be assigned to "A" that is the cassette 41. In this manner, a plurality of types of banknotes can be assigned to one cassette.

Each second field from the left in the display window 101 in FIG. 7 displays information indicating a banknote type of banknotes assigned to a corresponding cassette. For example, in the example of the display window 101 shown in FIG. 7, it is shown that "500 Euro" is assigned to the cassette indicated by "S1-1" (that is, the cassette 51) and the cassette indicated by "S1-2" (that is, the cassette 52), "20 Euro" is assigned to the cassette indicated by "A" (that is, the cassette 41), and "10 Euro" is assigned to the cassette indicated by "B" (that is, the cassette 42).

In the example of the display window 101 shown in FIG. 7, each third field from the left displays information indicating a banknote state as a first condition for banknotes. This field displays information indicating fit banknotes (Fit), unfit banknotes (Unfit) or a mix of fit banknotes and unfit banknotes (Mix) as the first condition for banknotes.

For example, in the example of the display window 101 shown in FIG. 7, it is shown that "500 Euro" with "Mix" as the first condition is assigned to the cassette indicated by "S1-1" (that is, the cassette 51) and the cassette indicated by "S1-2" (that is, the cassette 52). In addition, it is shown that "20 Euro" with "mix of fit banknotes and unfit banknotes (Mix)" as the first condition is assigned to the cassette indicated by "A" (that is, the cassette 41). It is shown that "10 Euro" with "mix of fit banknotes and unfit banknotes (Mix)" as the first condition is assigned to the cassette indicated by "B" (that is, the cassette 42).

Each fourth field from the left in the display window 101 in FIG. 7 displays information indicating a banknote state as a second condition for banknotes. This field displays information, as the second condition for banknotes, indicating whether an orientation of banknotes (orientation thereof when stacked in the cassette) is a forward orientation (Forward), a backward orientation (Backward), or a mix of forward and backward orientations (Mix). In addition, in case that the sorting and stacking device 1A is provided with a mechanism for making the orientations of banknotes consistent, such a display field indicating the orientations of banknotes (orientation thereof when stacked in the cassettes) is omitted.

In the example of the display window 101 shown in FIG. 7, it is shown that "500 Euro" with the first condition "mix of fit and unfit banknotes (Mix)" and the second condition "mix of forward and backward orientations (Mix)" is assigned to the cassette indicated by "S1-1" (that is, the cassette 51) and the cassette indicated by "S1-2" (that is, the cassette 52). In addition, it is shown that "20 Euro" with the first condition "mix of fit and unfit banknotes (Mix)" and the second condition "mix of forward and backward orientations (Mix)" is assigned to the cassette indicated by "A" (that is, the cassette 41). It is shown that "10 Euro" with the first condition "mix of fit and unfit banknotes (Mix)" and the second condition "mix of forward and backward orientations (Mix)" is assigned to the cassette indicated by "B" (that is, the cassette 42).

Each fifth (right end) field from the left in the display window 101 in FIG. 7 displays information indicating the fitness level of banknote of the type assigned to a corresponding cassette. For example, in the example of the display window 101 shown in FIG. 7, a level "5" is set as a fitness level for each banknote type assigned to each cassette.

The display window 102 is a display area for displaying a setup name called a "preset". The above-described "preset" is a setup name for all the setting contents as shown in FIG. 7. The above-described "preset" can be changed by clicking the right end of the display window 102, for example.

The read button 103 is a button for instructing to read the setting content of the preset displayed on the display window 102. The memory button 104 is a button for instructing storing of the contents set by the various types of buttons in FIG. 7 with the preset (setup name) displayed on the display window 102.

The banknote type designation buttons 111-117 are buttons for designating the types of banknotes. In the example shown in FIG. 7, the banknote type designation button 111 is a button for designating “5 Euro”, the banknote type designation button 112 is a button for designating “10 Euro”, the banknote type designation button 113 is a button for designating “20 Euro”, the banknote type designation button 114 is a button for designating “50 Euro”, the banknote type designation button 115 is a button for designating “100 Euro”, the banknote type designation button 116 is a button for designating “200 Euro”, and the banknote type designation button 117 is a button for designating “500 Euro”.

When, for example, “500 Euro” is to be assigned to “S1-1”, the banknote type designation button 117 is indicated while the field of “S1-1” is in the selected state (highlighted state), as shown in FIG. 7. With this operation, “500 Euro” banknotes are assigned to the cassette indicated by “S1-1”.

The state display icons 121 to 127 display the assignment state of the banknotes to the cassettes 41-46 in the sorting and stacking device 1A in accordance with the type and state of the banknotes. The example shown in FIG. 7 indicates the assignment state such that the display icon 121 is assigned to “5 Euro”, the display icon 122 is assigned to “10 Euro”, the display icon 123 is assigned to “20 Euro”, the display icon 124 is assigned to “50 Euro”, the display icon 125 is assigned to “100 Euro”, the display icon 126 is assigned to “200 Euro”, and the display icon 127 is assigned to “500 Euro”.

Figure 8:
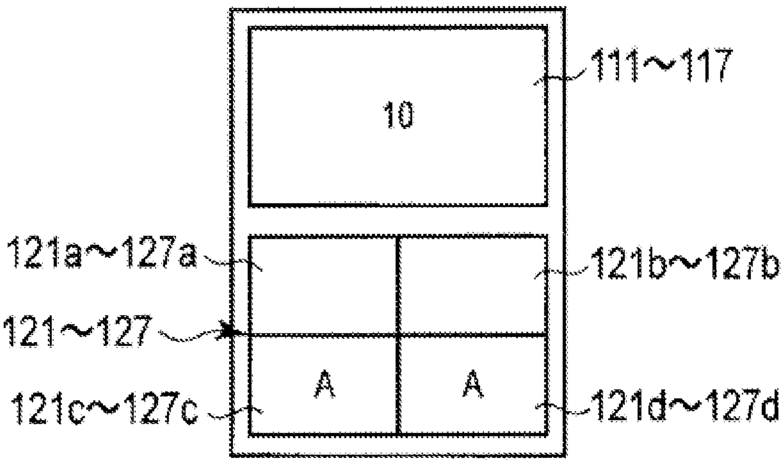
FIG. 8 is a view showing examples of banknote type designation buttons and assigned state display keys.
Figure 9:
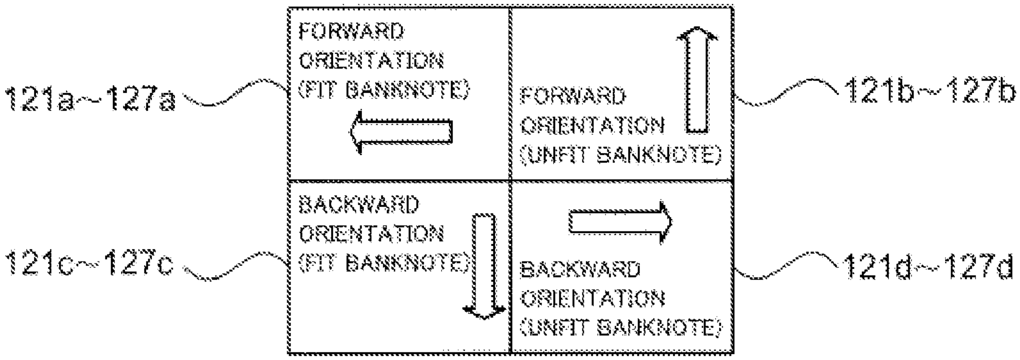
FIG. 9 is a view for describing an example of information represented by each assigned state display key.

For example, FIG. 8 is a view showing an example of the banknote type designation buttons 111-117 and state display icons 121-127. In addition, FIG. 9 is a view for describing the information represented by each of the state display icons 121-127. As shown in FIG. 8 and FIG. 9, the state display icons 121-127 are respectively composed of icons 121*a*-127*a* indicating the assignment state for fit banknotes in the forward orientation (fit and forward), icons 121*b*-127*b* indicating the assignment state for unfit banknotes in the forward orientation (unfit and forward), icons 121*c*-127*c* indicating the assignment state for fit banknotes in the backward orientation (fit and backward), and icons 121*d*-127*d* indicating the assignment state for unfit banknotes in the backward orientation (unfit and backward). Therefore, each of the state display icons 121-127 indicates the cassettes 41-46 to which corresponding banknote types are assigned for the four conditions.

The state designation button 130 is composed of a fit banknote button 131, a unfit banknote button 132, a forward orientation button 133, a the backward orientation button 134. The fit banknote button 131 is a button for designating a fit banknote (fit) as a condition for a banknote. The unfit banknote button 132 is a button for designating an unfit banknote (unfit) as a condition for a banknote. The forward orientation button 133 is a button for designating a forward orientation (forward) as a condition for a banknote. The backward orientation button 134 is a button for designating a backward orientation (backward) as a condition for a banknote.

The add button 141 is a button for instructing adding of a condition (banknote type and banknote state) and so on for banknotes assigned to a selected cassette. The delete button 142 is a button for instructing deleting of a condition (banknote type and banknote state) and so on for banknotes assigned to a selected cassette.

The fitness level setup button 151 is a button for instructing to change a threshold value for determining whether each banknote is a fit banknote or an unfit banknote. The apply button 152 is a button for instructing to apply the setting contents displayed on the window. The strap print set up button 153 is a button for instructing to set contents to be printed on a strap with which a predetermined number of banknotes are bundled by the sealing device 1B. The preset button 154 is a button for instructing to set a setup name as the preset. The return button 155 is a button for instructing to return the operation.

Next, an example of automatic cassette assign will be described. As described above, the banknote handling apparatus can assign cassettes based on the setting through the cassette assign window, and can also automatically assign cassettes based on the banknote handling amount data for the respective types or the banknote circulation amount data for the respective types.

For example, the communication section 84 of the controller 2 communicates with the external apparatus 3A (another banknote handling system, for example), receives the banknote handling amount data for the respective types from the external apparatus 3A, and the memory 81 stores the received banknote handling amount data for the respective types. For example, the banknote handling amount data for the respective types from the external apparatus 3A is data which is obtained as a result that banknotes have been handled by another one or a plurality of other banknote handling systems, and data indicating the number of handled banknotes of the respective types.

The determination unit 65 determines a banknote type of a banknote to be conveyed. The gate controller 64 determines a distribution destination of the banknote based on the banknote type determined by the determination unit 65 and the banknote handling amount data for the respective types. In addition, the gate controller 64 controls the gates G1-G9 (particularly the gates G5-G9) based on the determination result of the distribution destination of the banknotes to thereby distribute the banknotes (distributes into the cassettes 41-46).

For example, it is assumed that the memory 81 stores data that a banknote of a first banknote type of the largest handling amount is stacked into the cassette 46, a banknote of a second banknote type of the next large handling amount is stacked into the cassette 45, a banknote of a third banknote type of the next large handling amount is stacked into the cassette 44, and a banknote of a fourth banknote type of the next large handling amount is stacked into the cassette 44. In this case, under the control of the gates G1-G9 by the gate controller 64, a banknote of the first banknote type is distributed and stacked in the cassette 46, a banknote of the second banknote type is distributed and stacked in the cassette 45, a banknote of the third banknote type is distributed and stacked in the cassette 44, and a banknote of the fourth banknote type is distributed and stacked in the cassette 43.

If a case that an operator is arranged near the controller 2 is assumed, since the banknotes of the first banknote type of the largest handling amount are collected in the cassette 46, the burden of the operator is reduced.

In addition, the pickup controller 62 of the banknote handling system picks up a predetermined number of banknotes (100 sheets, for example) out of a plurality of banknotes loaded in the loading unit 4. The determination unit 65 determines banknote types of the predetermined number of picked up banknotes. The above-described banknote handling amount data for the respective types can be obtained based on the determination result for the respective types of these predetermined number of banknotes. The memory 81 stores the obtained banknote handling amount data for the respective types.

The determination unit 65 determines a banknote type of a banknote to be conveyed. The gate controller 64 determines a distribution destination of the banknote based on the banknote type determined by the determination unit 65 and the above-described collected banknote handling amount data for the respective types. In addition, the gate controller 64 controls the gates G1-G9 (particularly the gates G5-G9) based on the determination result of the distribution destination of the banknotes to thereby distribute the banknotes (distributes into the cassettes 41-46).

Or, priority is given to the distribution based on the banknote handling amount data for the respective types from the external apparatus 3A which the communication section 84 has received, and in case that the communication section 84 can not receive the banknote handling amount data for the respective types, the determination unit 65 may collect the banknote handling amount data for the respective types. In addition, in case that the determination unit 65 collects the banknote handling amount data for the respective types, since the predetermined number of banknotes are handled as described above, an operator returns these predetermined number of banknotes to the loading unit 4 after handling the predetermined number of banknotes. Or, the sorting and stacking device 1A may be provided with a mechanism to return a predetermined number of banknotes to the loading unit 4.

Furthermore, in addition to the banknote handling amount data for the respective types, the banknote circulation amount data for the respective types may be utilized. The communication section 84 of the controller 2 communicates with the external apparatus 3B (a server to hold the circulation amount data, for example), receives the banknote circulation amount data for the respective types from the external apparatus 3B, and the memory 81 stores the received banknote circulation amount data for the respective types.

The determination unit 65 determines a banknote type of a banknote to be conveyed. The gate controller 64 determines a distribution destination of the banknote based on the banknote type determined by the determination unit 65 and the banknote circulation amount data for the respective types. In addition, the gate controller 64 controls the gates G1-G9 (particularly the gates G5-G9) based on the determination result of the distribution destination of the banknotes to thereby distribute the banknotes (distributes into the cassettes 41-46).

Or, priority is given to the distribution based on the banknote handling amount data for the respective types from the external apparatus 3A which the communication section 84 has received, and in case that the communication section 84 can not receive the banknote handling amount data for the respective types, the communication section 84 may collect the banknote circulation amount data for the respective types in place of the banknote handling amount data for the respective types.

Figure 10:
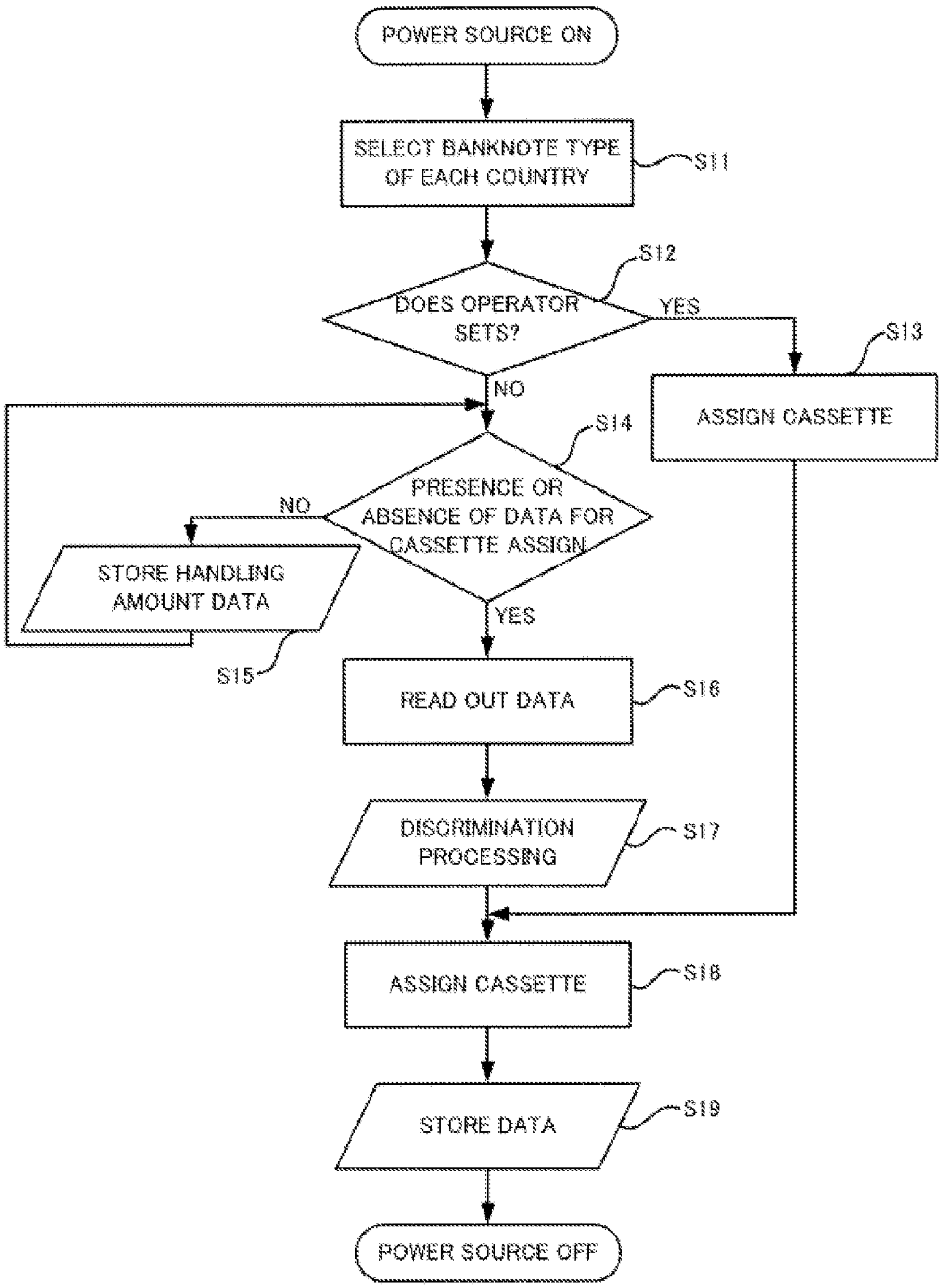
FIG. 10 is a flow chart showing an example of assigning processing of the cassettes.

FIG. 10 is a flow chart showing an example of an automatic cassette assign.

For example, an operator designates a country name through the operation unit 83, and selects a banknote type of a banknote to be handled (S11). In addition, the operator can set assignment of the cassettes for the respective banknote types through the operation unit 83 (S12, YES) (S13).

Even in case that the operator does not set the assignment of the cassettes (S12, NO), if the banknote handling amount data for the respective types is not present (S14, NO), the controllers 60 and 80 instruct banknote conveying handling, and collect and store the banknote handling amount data for the respective types (S15). For example, the pickup controller 62, based on the instruction of the banknote conveying handling, picks up a predetermined number (100 sheets, for example) of banknotes out of a plurality of banknotes loaded in the loading unit 4. The determination unit 65 discriminates banknote types of these predetermined number of picked up banknotes, and based on the discrimination result of the banknote types of these predetermined number of banknotes, collects the above-described banknote handling amount data for the respective types. The memory 81 stores the collected banknote handling amount data for the respective types.

By the above-described steps, the banknote handling amount data for the respective types is stored (S14, YES), the determination unit 65 reads out the banknote handling amount data for the respective types from the memory 81 (S16), and executes determination processing (S17), and assigns the banknotes to the cassettes for the respective banknote types (S18). That is, the determination unit 65 determines a banknote type of the banknote to be conveyed, and the gate controller 64 determines a distribution destination based on the determined banknote type and the above-described collected banknote handling amount data for the respective types. In addition, the gate controller 64 controls the gates G1-G9 (particularly, the gates G5-G9) based on the determination result of the distribution destination of the banknotes to thereby distribute the banknotes (distributes into the cassettes 41-46).

In addition, the banknote handling amount data for the respective types obtained by the above-described determination processing is further stored in the memory 81 (S19).

In addition, the determination unit 65 detects the pollution degree of a banknote to be conveyed to thereby determine the banknote into a fit banknote and an unfit banknote, and the gate controller 64 may determine the distribution destination of the banknotes based on the handling amount data of the determined fit banknotes and the handling amount data of the determined unfit banknotes.

Hereinafter, the banknote handling system of the present embodiment will be summarized.

For example, if an operator sets cassettes for the respective banknote types without considering the handling amount of banknotes, banknotes of a large handling amount are sometimes stacked in the cassette which is remotest from the operator's seat, and thereby the burden of the operator becomes large. In addition, when it is considered that the burden of the operator is large, if the assignment of the cassettes for the respective banknote types is tried to change, the present operation must be once ended to thereby cause inconvenience.

Consequently, as described above, the banknote handling system of the present embodiment, in addition to that an operator can set cassettes for the respective banknote types, can automatically assign cassettes depending on the handling amount of banknotes based on the past banknote handling amount data for the respective types.

For example, the banknote handling system collects (downloads) the handling amount data of the respective banknote types collected by another banknote handling system, and thereby automatically assigns the cassettes for the respective banknote types based on the collected banknote handling amount data for the respective types.

In addition, in case that the banknote handling system can not collect the above-described banknote handling amount data for the respective types, the banknote handling system can also automatically assign the cassettes for the respective banknote types based on the banknote circulation amount data for the respective types.

Since the banknote handling system of the present embodiment assigns the cassettes for the respective banknote types depending on the banknote handling amount for the respective types (or changes the assignment of the cassettes for the respective banknote types), it is possible to assign the banknotes to the cassettes which are near the operator's seat, in descending order of the handling amount. By this means, operational efficiency after banknotes have been stacked is improved.

Hereinafter, the operation and effect of the banknote handling system of the present embodiment will be summarized.

(1) The storage destination for banknotes of a type, in which the number of access times by an operator is considered to be large and the handling amount of which is large, is assigned to a cassette near the operator, and thereby operational efficiency is improved.

(2) By using information such as the handling amount data which has been hitherto accumulated, and the handling amount data and the circulation amount data collected by another banknote handling system, it is possible to assign a storing destination for banknotes of a type whose handling amount is large to a cassette near the operator, and thereby the burden when the operator recovers the banknotes can be reduced.

(3) Even in case that the handling amount data can not be obtained, the circulation amount data is obtained and used in place of the handling amount data, and as a result, it is possible to assign a storing destination for banknotes of a type whose handling amount is large to a cassette near the operator, and thereby the burden when the operator recovers the banknotes can be reduced.

(4) By registering, storing and using the handling amount data or the circulation amount data of banknotes of each country, it becomes possible to assign the cassettes depending on the handling amount of banknotes of each country.

While certain embodiments have been described, these embodiments have been presented by way of example only, and are not intended to limit the scope of the inventions. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sheet handling apparatus comprising:

a pickup unit which picks up a plurality of sheets loaded in a loading unit;

a first determining unit which determines a type or a state of the sheet picked up by the pickup unit;

a data collecting unit which collects handling amount data for respective types of the sheets or respective states of the sheets;

a second determining unit which determines a distribution destination of the sheet based on the handling amount data for the respective types or the respective states of the sheets which are determined by the first determining unit;

a distributing unit which distributes the sheet based on a determination result of the distribution destination of the sheet by the second determining unit; and a stacking unit composed of a plurality of cassettes to stack the distributed sheets, wherein the data collecting unit receives the handling amount data of the respective types or the respective states from an external apparatus, the handling amount data being obtained by an external sheet handling system that is separate from and external to the sheet handling apparatus.

2. The apparatus of claim 1, wherein a predetermined number of the sheets out of the plurality of sheets loaded in the loading unit are picked up by the pickup unit, the types or the states of the predetermined number of picked up sheets are determined, and the data collecting means obtains the handling amount data for the respective types or the respective states based on the determination result for the respective types or the respective states of the predetermined number of sheets.

3. The apparatus of claim 1, wherein the data collecting unit receives circulation amount data for the respective types or the respective states from the external apparatus, the second determining unit determines the distribution destination of the sheet based on the circulation amount data for the respective types or the respective states received from the external apparatus, in place of the handling amount data for the respective types or the respective states.

4. The apparatus of claim 2, wherein when the data collecting unit cannot receive the handling amount data for the respective types or the respective states from the external apparatus, the data collecting unit obtains the handling amount data for the respective types or the respective states of the sheets based on the determination result of the respective types or the respective states of the predetermined number of sheets.

5. The apparatus of claim 3, wherein when the data collecting unit cannot collect the handling amount data for the respective types or the respective states, the data collecting unit receives the handling amount data for the respective types or the respective states from the external apparatus.

6. The apparatus of claim 1, wherein the second determining unit discriminates a first cassette out of the plurality of cassettes as a collection destination of the sheets of a first type or state having a first handling amount based on the handling amount data, and discriminates a second cassette out of the plurality of cassettes as a collection destination of the sheets of a second type or state having a second handling amount smaller than the first handling amount based on the handling amount data, and the distributing unit, based on a discrimination result of the distribution destination of the sheet, distributes the sheet of the first type or state into the first cassette, and distributes the sheet of the second type or state into the second cassette.

7. The apparatus of claim 1, wherein the state of the sheet indicates a fit banknote or an unfit banknote depending on a soilure degree of the sheet.

8. The apparatus of claim 7, wherein the second determining unit determines the distribution destination based on the handling amount data of the fit banknotes and the unfit banknotes.

9. A sheet handling method comprising:

collecting handling amount data for respective types or respective states of sheets, the handling amount data being obtained by an external sheet handling system separate from and external to a sheet handling apparatus;

picking up a plurality of the sheets loaded in a loading unit of the sheet handling apparatus;

determining the type or the state of the picked up sheet;

determining a distribution destination of the sheet based on the handling amount data for the respective types or the respective states of the sheets which are determined;

distributing the sheet based on a determination result of the distribution destination of the sheets; and stacking the distributed sheets in a plurality of stacking portions of the sheet handling apparatus.

10. The method of claim 9, wherein a predetermined number of the sheets out of the plurality of sheets loaded in the loading unit are picked up, the types or the states of the predetermined number of picked up sheets are determined, and the data collecting step obtains the handling amount data for the respective types or the respective states based on the determination result for the respective types or the respective states of the predetermined number of sheets.

11. The method of claim 9, wherein the data collecting step receives circulation amount data for the respective types or the respective states from an external apparatus, and the step to determine a distribution destination determines the distribution destination of the sheet based on the circulation amount data for the respective types or the respective states received from the external apparatus, in place of the handling amount data for the respective types or the respective states.

12. The method of claim 10, wherein when the data collecting step cannot receive the handling amount data for the respective types or the respective states from the external apparatus, the data collecting step obtains the handling amount data for the respective types or the respective states of the sheets based on the determination result of the respective types or the respective states of the predetermined number of sheets.

13. The method of claim 11, wherein when the data collecting step cannot collect the handling amount data for the respective types or the respective states, the data collecting step receives the handling amount data for the respective types or the respective states from the external apparatus.

14. The method of claim 9, wherein the step to determine a distribution destination discriminates a first cassette out of the plurality of cassettes as a collection destination of the sheets of a first type or state having a first handling amount based on the handling amount data, and discriminates a second cassette out of the plurality of cassettes as a collection destination of the sheets of a second type or state having a second handling amount smaller than the first handling amount based on the handling amount data, and the distributing step, based on a discrimination result of the distribution destination of the sheet, distributes the sheet of the first type or state into the first cassette, and distributes the sheet of the second type or state into the second cassette.

15. The method of claim 9, wherein the state of the sheet indicates a fit banknote or an unfit banknote depending on a soilure degree of the sheet.

16. The method of claim 15, wherein the step to determine a distribution destination determines the distribution destination based on the handling amount data of the fit banknotes and the unfit banknotes.

* * * * *